United States Patent [19]
Reeves et al.

[11] Patent Number: 5,790,160
[45] Date of Patent: *Aug. 4, 1998

[54] TRANSPARENCY IMAGING PROCESS

[75] Inventors: Barry D. Reeves, Lake Oswego; Loc V. Bui, Beaverton; Clark W. Crawford, Wilsonville; James D. Rise, West Linn; Barry E. Morgan, Clackamas; Larry Church; Mark Parker, both of Portland, all of Oreg.

[73] Assignee: Tektronix, Inc., Wilsonville, Oreg.

[*] Notice: The term of this patent shall not extend beyond the expiration date of Pat. No. 5,389,958.

[21] Appl. No.: 582,332

[22] Filed: Jan. 16, 1996

Related U.S. Application Data

[60] Continuation-in-part of Ser. No. 231,598, Apr. 22, 1994, which is a division of Ser. No. 981,677, Nov. 25, 1992, Pat. No. 5,372,852.

[51] Int. Cl.$^6$ .................................................. B41J 2/05
[52] U.S. Cl. .................................................. 347/103
[58] Field of Search ............................ 347/88, 99, 103

[56] References Cited

U.S. PATENT DOCUMENTS

| | | |
|---|---|---|
| 2,340,562 | 2/1944 | Rey ............................ 369/13 |
| 4,368,669 | 1/1983 | Love, III ....................... 101/492 |
| 4,538,156 | 8/1985 | Durkee et al. . |
| 4,673,303 | 6/1987 | Sansone et al. . |
| 4,801,473 | 1/1989 | Creagh et al. . |
| 4,853,706 | 8/1989 | Van Brimer et al. . |
| 4,889,560 | 12/1989 | Jaeger et al. . |
| 4,889,761 | 12/1989 | Titterington et al. . |
| 4,992,304 | 2/1991 | Titterington et al. . |
| 5,092,235 | 3/1992 | Rise . |
| 5,099,256 | 3/1992 | Anderson . |
| 5,372,852 | 12/1994 | Titterington et al. . |
| 5,389,958 | 2/1995 | Bui et al. . |

*Primary Examiner*—Adolf Berhane
*Attorney, Agent, or Firm*—Ralph D'Alessandro

[57] ABSTRACT

A method and an apparatus for processing an image transparency entails the application of an intermediate transfer surface of a layer of sacrificial liquid to a supporting surface and the deposition of a phase change ink onto the liquid layer. The inked image is then contact transferred to an optically transmissive final receiving substrate, such as a plastic transparency.

25 Claims, 2 Drawing Sheets

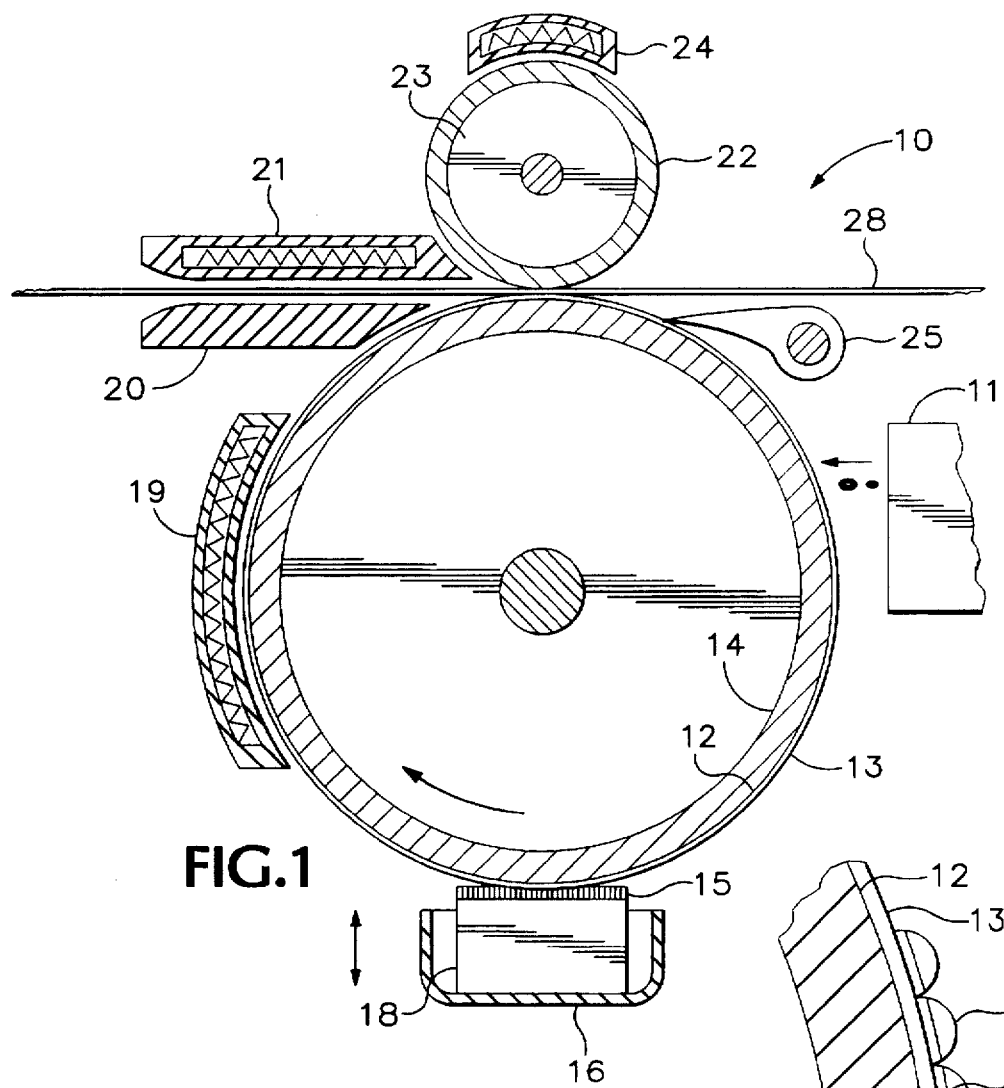
FIG.1
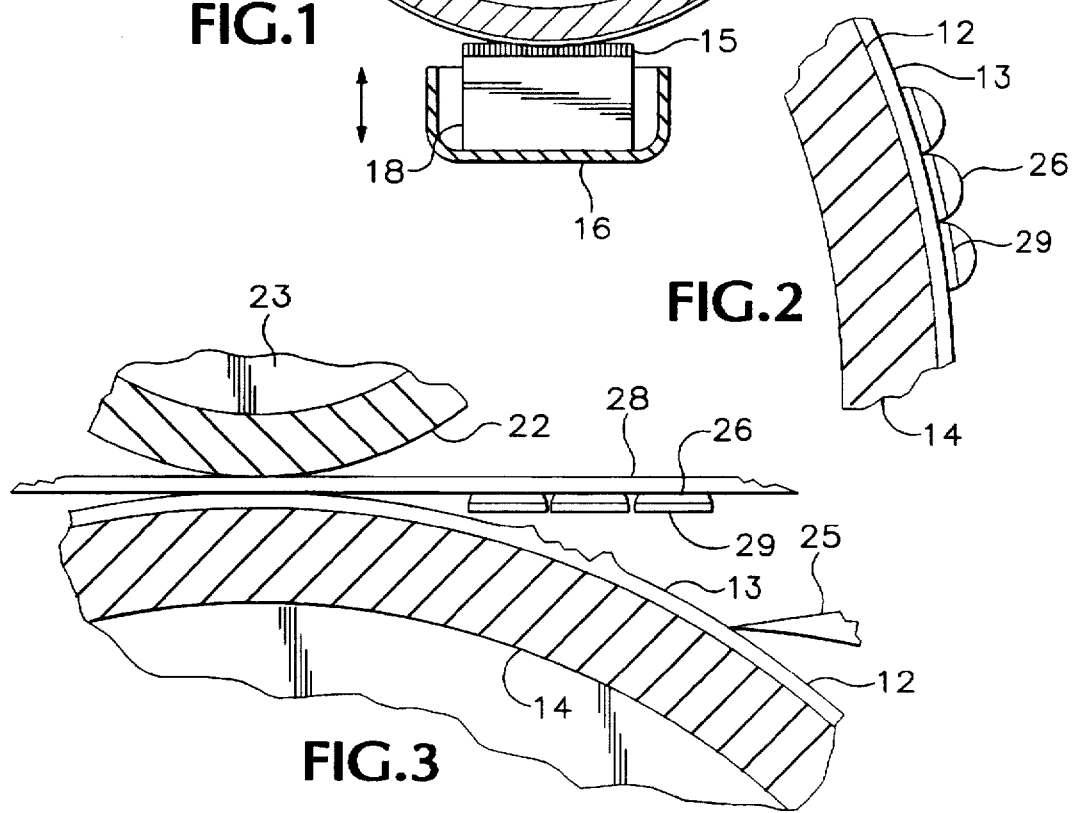
FIG.2
FIG.3

TRANSPARENCY IMAGING PROCESS

This is a continuation-in-part of application Ser. No. 08/231,598 filed Apr. 18, 1994, which is a divisional of U.S. Pat. No. 5,372,852 issued Dec. 13, 1994.

FIELD OF INVENTION

This invention relates generally to an imaging process. More specifically, this invention relates to the particular supporting surface employed and the ink jet printing system and process that are suitable for making transparencies. The system utilizes an intermediate transfer surface and a supporting surface to make a transparency, such as a transparent film suitable for viewing an image printed thereon using an overhead projector.

BACKGROUND OF INVENTION

Ink jet printing systems have been employed utilizing intermediate transfer surfaces, such as that disclosed in U.S. Pat. No. 4,538,156 to Durkee et al. This patent discloses a system wherein an intermediate transfer surface is employed with a printhead. The intermediate surface is supported on the surface of a drum. A transparency film is brought into contact with the intermediate transfer surface after the image has been placed thereon by the nozzles in the printhead. The image is then transferred to the transparency film.

U.S. Pat. No. 5,099,256 to Anderson describes an intermediate drum with a surface which receives ink droplets from a printhead. The intermediate drum surface is thermally conductive and formed from a suitable film-forming silicone polymer allegedly having a high surface energy and high degree of surface roughness to prevent movement of the ink droplets after receipt from the printhead nozzles. Other imaging patents, such as U.S. Pat. Nos. 4,731,647 and 4,833,530 to Kohsahi, disclose a solvent which is deposited on colorant to dissolve the colorant and form a transferable drop to a recording medium. The colorants are deposited directly onto paper or plastic colorant transfer sheets. The transferable drops are then contact transferred to the final receiving surface medium.

U.S. Pat. No. 4,673,303 to Sansone et al. discloses an offset ink jet postage printing method and apparatus in which an inking roll applies ink to the first region of a dye plate. A lubricating hydrophilic oil can be applied to the exterior surface of the printing drum or roll to facilitate the accurate transfer of the images from the drum or roll to the receiving surface.

All of these processes do not achieve a complete image transfer from the intermediate transfer surface and, therefore, require a separate cleaning step to remove any residual ink from the intermediate receiving surface. The inclusion of cleaning apparatus is both costly and time consuming in color printing equipment. Prior intermediate transfer surfaces also have not been renewable.

Moreover, all of these processes are limited in the degree of image quality which can be achieved on different types of final receiving surfaces. Since the inks are fluids, they are subject to uncontrolled spreading on transparency films. Phase change ink presents an additional problem since it expands differently on transparent films than it does on paper. Phase change ink disperses or spreads over a broader surface area on a transparent film than on paper.

Unlike solvent based inks, phase change inks adhere to the surface of transparencies instead of penetrating the substrate. Consequently, phase change ink droplets retain a greater degree of three-dimensional form when applied to light or optically transmissive media, such as transparency films. The resulting three-dimensional ink pixels scatter transmissive light in the manner of a dioptric lens. Consequently, transparencies imaged with phase change ink exhibit a greyness and darkening as a result of light divergence by the ink spots. The colored image portions appear particularly dulled in contrast to non-inked areas where there are no light diverging ink droplets to reduce the color intensity of the image.

Various prior processes have been used to reduce light divergence caused by the dioptric character of ink droplets applied to transparencies. U.S. Pat. No. 4,801,473 to Creagh et al. discloses a liquid coating method in which a transparent liquid layer is applied to an imaged transparency. It is said that the coating has an index of refraction close to that of the ink droplets so that the maximum deviation of transmitted light is significantly reduced by the optical planarization of the liquid layer applied to the imaged transparency surface. Another solution is presented in U.S. Pat. No. 4,889,761, which is assigned to the assignee of this application, wherein reorientation of the ink droplets significantly improves rectilinear light transmission through imaged transparencies.

Despite reducing divergence of light passing through transparencies imaged with phase change inks, methods of the prior art require post printing operations. Additionally, some prior methods apply mechanical and thermal stresses that may adversely affect thin plastic transparencies.

Another problem when attempting to produce a good quality transparency that is particular to solid or phase change ink imaging using offset or intermediate transfer printing is that areas of solid fill tend to buckle and the ink can lift off of the final receiving surface upon transfer to the final receiving surface because of the lack of space for expansion between adjacent ink drop masses. The ink that has been lifted off of the final receiving surface usually falls back down in long, wavy strips, adversely affecting image quality.

Additionally, a single layer of ink on a transparent surface does not possess the saturation of a single layer of ink on paper because light reflected off of paper must make two passes through the ink, one inbound to the paper and the other outbound from the paper. In contrast, light directed at a transparency makes only a single pass through the layer of ink since the transparency transmits the light through, not reflecting it back out as does paper. This can result in a washed out or dull appearing transparency color.

These problems are solved in the process and apparatus of the present invention by providing an apparatus and process which supplies a liquid layer as the intermediate transfer surface on a supporting surface for the transferred image. The image is then transferred with at least a portion of the liquid layer to an optically transmissive final receiving medium. The image is preferably formed from a phase change ink. Pressure contact transference to final media such as transparencies creates substantially parallel top and bottom surfaces in the ink droplets to optically planarize the phase change ink droplets. This enhances the brightness or color saturation of the final images. The apparatus and process produce uniformly high quality images on a wide range of optically transmissive media through the use of phase change ink that is transferred to the optically transmissive medium in a malleable solid state.

SUMMARY OF THE INVENTION

It is an aspect of the present invention to provide an improved imaging method and apparatus which achieves high quality imaging that results in image sharpness and high color saturation in the projected image on a variety of optically transmissive media and obviates the need for a separate post printing or processing step.

It is another aspect of the present invention to provide an improved imaging apparatus and method for imaging that utilizes an intermediate liquid layer on a supporting surface which receives the image to be transferred prior to transferring the image to an optically transmissive final receiving medium, such as a plastic transparency.

It is a feature of the present invention that the liquid layer is a sacrificial layer on the supporting surface which can at least partially be transferred with the transferred image to an optically transmissive final receiving medium.

It is another feature of the present invention that the liquid layer acts as a release agent on the supporting surface.

It is still another feature of the present invention that the supporting surface is a rotatable drum.

It is yet another feature of the present invention that the liquid layer can be selected from the group consisting of water, fluorinated oil, glycol, surfactant, mineral oil, silicone oil, functional oil and combinations thereof.

It is yet a further feature of the present invention that a simple path for the transparency or final receiving medium through the imaging apparatus is obtained by the present invention to thereby minimize both the expense and the mechanical parts for transparency or final medium handling and the amount of time needed for the apparatus to handle the optically transmissive final receiving medium.

It is still a further feature of the present invention that a double pass print, placing exactly the same bit-mapped ink image down twice on the liquid layer on the supporting surface, is made prior to transferring the image to the transparent or optically transmissive final receiving medium.

It is another feature of the present invention that voids or locations for expansion are provided in the ink in the bit-mapped ink image via a selected dither pattern to permit the ink to expand upon transfer to the transparent or optically transmissive final receiving medium.

It is still another feature of the present invention that the liquid layer which serves as the intermediate transfer layer is sufficiently thick that a multiplicity of images can be transferred before it is necessary to replenish the liquid layer present on the supporting surface.

It is an advantage of the present invention that there is no image distortion, uneven bump contours, or gross movement of the ink in the transferred images on the transparent or optically transmissive final receiving medium, especially when areas are completely filled with ink ("solid fill areas").

It is another advantage of the present invention that the liquid layer is replenishable on the supporting surface for subsequent images and some extremely small portion is transferred with the image to the optically transmissive image receiving medium.

It is another advantage of the present invention that the supporting surface need not be cleaned prior to re-imaging with a different color or the same color.

It is yet a further advantage of the present invention that high quality images resulting in image sharpness and high color saturation in the projected images can be produced on a variety of optically transmissive final receiving surfaces or media.

These and other aspects, features and advantages are obtained by the apparatus and the method of utilizing that apparatus by applying a liquid layer to a supporting surface such that the liquid layer has at least a first surface not in contact with the supporting surface which receives the image to be transferred thereon followed by transferring of that image to an optically transmissive final receiving medium.

BRIEF DESCRIPTION OF THE DRAWINGS

These and other aspects, features and advantages of the invention will become apparent upon consideration of the following detailed disclosure of the invention, especially when it is taken in conjunction with the accompanying drawings wherein:

FIG. 1 is a diagrammatic illustration of the apparatus having a supporting surface adjacent to a liquid layer applicator and a print head which applies the image to be transferred to the liquid layer;

FIG. 2 is an enlarged diagrammatic illustration of the liquid layer acting as an intermediate transfer surface supporting the ink;

FIG. 3 is an enlarged diagrammatic illustration of the transfer of the inked image from the liquid intermediate transfer surface to a transmissive final receiving surface.

DETAILED DESCRIPTION OF A PREFERRED EMBODIMENT

Figure 4:
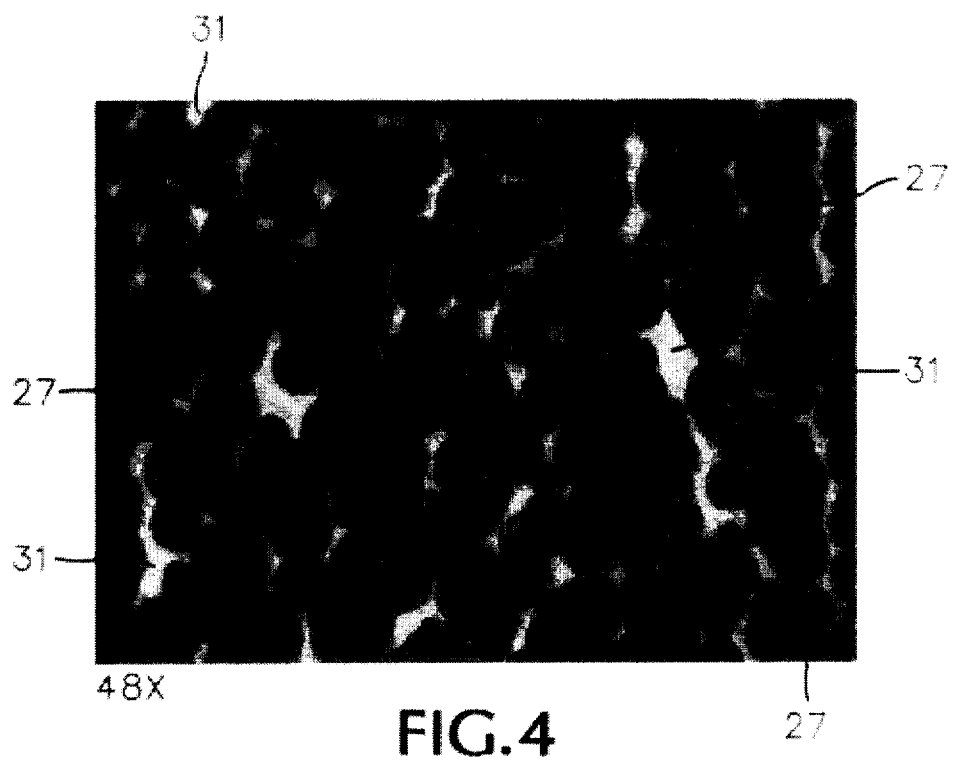
FIG. 4 is a photographic illustration of the expansion voids in the ink pattern of a bit-mapped image magnified 48 times.

FIG. 1 discloses a diagrammatical illustration of the imaging apparatus 10 utilized in the instant process to transfer an inked image from an intermediate transfer surface to an optically transmissive final receiving substrate. Optically transparent films are the primary intended media for image receipt.

The most typical of these film materials for possible use as a final receiving medium are sheets of cellulose acetate, cellulose triacetate, or polyester (polyethylene terephthalate). Other substrates which can be employed to advantage in this invention are sheets of polycarbonate and polystyrene. For example, polyester (polyethylene terephthalate) film is available from E. I. DuPont de Nemours & Co. of Wilmington, Del., and is sold under the trademark Mylar®, or from ICI Americas sold under the trademark Milinex®.

A printhead 11 is supported by an appropriate housing and support elements (not shown) for either stationary or moving utilization to place an ink in the liquid or molten state on the intermediate transfer surface 12 of FIGS. 2 and 3 that is applied to the surface of the supporting surface 14. Intermediate transfer surface 12 is a liquid layer that is applied to the supporting surface 14, which is shown as a drum, but may also be a web, platen, or any other suitable design, by contact with an applicator, such as a metering blade, roller, web or the shown wicking pad 15 contained within applicator assembly 16.

The supporting surface 14 may be formed from any appropriate material, including coated material. Appropriate materials can encompass metals including, but not limited to aluminum, nickel or iron phosphate; elastomers including, but not limited to, fluoroelastomers, perfluoroelastomers, silicone rubber and polybutadiene; plastics including, but not limited to, polytetrafluorethylene loaded with polyphenylene sulfide; thermoplastics such as polyethylene, nylon, and FEP; ceramics including, but not limited to, alumina; or thermosets such as acetals. Other appropriate materials could be employed as long as the exposed surface is sufficiently rigid to deform the transferred image-forming ink 26 when the final receiving medium passes between it and the transfer and fixing roller 22. The exposed surface should be sufficiently smooth so as not to interfere with the ability of the intermediate transfer surface or liquid layer to support the image-forming ink 26 of FIG. 3. The preferred material is anodized aluminum and it is sealed with silicone oil in lieu of a standard anodizing seal.

The selection of one material over another for the supporting surface 14 is greatly influenced by the thermal and Theological properties of the phase change ink employed, as well as the type of liquid utilized as the intermediate transfer surface 12. The method of application of the liquid to the supporting surface 14 can also affect the choice of material, such as the use of an internally applied liquid agent that has been absorbed into a porous supporting material from which it seeps to coat the external surface, potentially obviating or substantially decreasing the need for re-wetting of the supporting surface 12. Regardless, surface roughness, durability, cost, and ink transfer efficiency are factors that must also be considered.

In a preferred embodiment, the supporting surface is conditioned to retain a portion of the applied liquid layer while releasing partial portions of the sacrificial liquid layer with each image transfer to a final transmissive medium. In conjunction with the applied liquid layer, the surface conditioning and temperature of the supporting surface can combine to enhance drop spreading of applied droplets of phase change inks.

A controlled roughness or porosity of the supporting surface is a preferred attribute of a conditioned surface. Roughening the surface raises the maximum operating temperature of the supporting surface. It is theorized that a rougher surface acts as a reservoir for the liquid layer and minimizes the contact area between the ink droplets and the liquid layer-coated supporting surface to facilitate complete image transfer to the final light transmissive receiving medium.

The roughness of the supporting surface is embossed upon the surface of the image as it is transferred or applied to the final medium. This microscopic roughness is readily apparent on the final transparency as a gloss or matte finish. If the supporting surface is excessively roughened, the projected transparency looses color saturation because of the non-rectilinear transmission of light therethrough as a result of the embossed roughness from the supporting surface on the image. Also final prints may be easily scratched because of burnishing of microscopic ink peaks. In contrast, too little roughness will result in a highly reflective or glossy on a paper substrate print which can be undesirable. Acceptable degrees of roughness are achievable by varying the machining parameters used in fabricating the substrate that is faced with the supporting surface. Chemical etching with caustic agents also imparts surface roughness that provide good quality transparencies and complete image transfer. Other methods for appropriately roughening the supporting surface include electropolishing, embossing, and sand or bead blasting.

Applicator assembly 16 contains a reservoir and wicking pad 15 for the liquid for contact with the drum 14. Wicking pad 15 and the wicking assembly is described in greater detail in co-pending application U.S. patent application Ser. No. 08/382,453 filed Jan. 31, 1995, assigned to the assignee of the present invention and hereby specifically incorporated by reference in pertinent part. One configuration can employ the smooth wicking pad 15 mounted atop a porous supporting material 18, such as a polyester felt. Applicator apparatus 16 is mounted for retractable movement upward into contact with the surface of drum 14 and downwardly out of contact with the surface of the drum 14 and its liquid layer 12 by means of an appropriate mechanism, such as an air cylinder, cam, or an electrically actuated solenoid.

FIG. 1 shows a final substrate guide 20 that passes the optically transmissive final receiving substrate 28, such as a plastic transparency, from a positive feed device (not shown) and guides it through the nip formed by the opposing arcuate surfaces of the roller 22 and the intermediate transfer surface 12 supported by the drum 14. Stripper fingers 25 (only one of which is shown) may be pivotally mounted to the imaging apparatus 10 to assist in removing any film transparency or other optically transmissive final receiving substrate media from the exposed surface of the liquid layer forming the intermediate transfer surface 12. Preferably roller 22 has a metallic core, such as steel, with an elastomeric covering that has a 40 to 45 Shore D rating. Suitable elastomeric covering materials include silicones, urethanes, nitriles, EPDM and other appropriately resilient materials. The elastomeric covering on roller 22 engages the transmissive final receiving substrate 20 on the reverse side to which the ink image 26 is transferred from the exposed surface of the liquid layer forming the intermediate transfer surface 12. This fuses or fixes the ink image 26 to the surface of the optically transmissive receiving surface so that the ink image is spread, flattened and adhered.

Preferably, the ink utilized in the process and system of the instant invention is initially in solid form and is then changed to a molten state by the application of heat energy to raise the temperature to about 85° C. to about 150° C. Elevated temperatures above this range will cause degradation or chemical breakdown of the ink. The molten ink is then applied in raster fashion from the ink jets in the printhead 11 to the exposed surface of the liquid layer forming the intermediate transfer surface 12, where it is cooled to an intermediate temperature and solidifies to a malleable state in which it is transferred to the transmissive final receiving medium 28 via a contact transfer by entering the nip between the roller 22 and the liquid layer forming the intermediate transfer surface 12 on the support surface or drum 14. This intermediate temperature where the ink is maintained in its malleable state is between about 30° C. to about 80° C.

The ink is applied to the exposed surface of the liquid intermediate transfer surface 12 by the printhead 11 passing twice over the surface 12 in a double-pass to place the same bit-mapped image 26 twice on the surface 12 in the same location before transferring the image to the optically transmissive final receiving surface or substrate 28. Once the second pass of the printhead 11 has laid down the image 26 the second time, the ink image 26 is transferred to the optically transmissive final receiving substrate 28. The extra ink placed during the second pass of the printhead 11 compensates for the single pass of light through the ink in the bit-mapped image 26 to achieve the desired saturation.

The bit-mapped ink image 26 is laid down with a random or irregular pattern of white spaces or voids 31, as seen in FIG. 4, between the individual drops 27 of ink. These white spaces 31 provide room for expansion of the ink during the transfer of the ink to the optically transmissive final receiving substrate 28 as the image 26 passes through the nip formed between the transfer and fixing roller 22 and the liquid intermediate transfer surface 12 on the support surface or drum 14. Any dithering pattern could be employed, but a more preferred pattern is described in co-pending U.S. patent application Ser. No. 08/381,615 filed Jan. 30, 1995, assigned to the assignee of the present invention and hereby specifically incorporated by reference in pertinent part, to create the voids or empty spaces into which the ink can expand during transfer and fixing. In this manner the white spaces serve as expansion joints. For primary colors in areas solidly filled with ink (solid fills), this requires about 85% to about 98% of the normal primary color density, more preferably about 90% to about 97%, and most preferably about 95%. For secondary colors, where two primary colors (i.e. cyan, magenta, yellow and black) are superimposed to obtain via substractive color printing the desired secondary colors, the white spaces result in solid fills of about 65% to about 75%, more preferably about 67% to about 73% and most preferably about 70% of the normal secondary color density. In printing secondary color fills this requires four layers of ink to be laid down, each layer having about 105 nanograms of ink. With about a 70% dither pattern providing about 70% of the normal secondary color density, this results in about 294 nanograms (70% of 420 nanograms) being deposited. Similarly, for a primary color solid fill with about a 95% dither pattern, this results in about 199.5 nanograms (95% of 210 nanograms) being deposited.

Once the solid malleable ink image enters the roller nip, it is deformed to its final image conformation and adheres or is fixed to the optically transmissive final receiving substrate 28 either by the pressure exerted against ink image 26 on the final receiving substrate 28 by the roller 22 alone, or by the combination of the pressure and heat supplied by heater 21 and/or heater 19. Heater 24 could optionally be employed to supply heat to facilitate the process at this point. The pressure exerted on the ink image 26 is between about 0.7 kg/sq cm to about 140 kg/sq cm (10 to about 2000 pounds per square inch (psi)), more preferably between about 35.2 kg/sq cm to about 70.3 kg/sq cm (500 to about 1000 psi), and most preferably between about 52.7 kg/sq cm to about 59.8 kg/sq cm (750 to about 850 psi). The pressure must be sufficient to have the ink image 26 adhere to the transmissive final receiving substrate 28 and be sufficiently deformed so that it has a smooth, flat top surface to ensure that light is transmitted through the ink image rectilinearly or without significant deviation in its path from entrance to exit. Once adhered to the transmissive final receiving substrate 28, the ink image is cooled to ambient temperature of about 20–25 degrees Centigrade.

The ink comprising the ink image must be ductile, or be able to yield or experience plastic deformation without fracture when kept at a temperature above the glass transition temperature. Below the glass transition temperature the ink is brittle. The temperature of the ink image in the ductile state is between about –10° C. and the melting point of less than about 85° C. The phase change ink used to form images in the printer 10 employing the present invention should have the properties and characteristics disclosed in U.S. Pat. No. 5,372,852 issued Dec. 13, 1994 and assigned to the assignee of the present invention. The temperatures and rheological properties necessary for the application of this type of an ink and the thickness of the liquid intermediate transfer layer are also disclosed in the aforementioned patent.

FIG. 3 diagrammatically illustrates the sequence involved when an ink image 26 is transferred from the liquid layer forming the intermediate transfer surface 12 to the optically transmissive final receiving substrate 28. As seen in FIG. 3, the ink image 26 transfers to the final receiving substrate 28 with a small but measurable quantity of the liquid in the intermediate transfer surface 12 attached thereto as an outer layer 29. The average thickness of the transferred liquid layer 29 is calculated to be between about 30 to about 600 nanometers. Alternatively, the quantity of transferred liquid layer 29 can be expressed in terms of mass as being from about 0.1 to about 200 milligrams, and more preferably from about 0.5 to about 50 milligrams, and most preferably from about 1 to about 10 milligrams per page of final receiving substrate 28. This is determined by tracking on a test fixture the weight loss of the liquid in the applicator assembly 16 at the start of the imaging process and after a desired number of sheets of optically transmissive final receiving substrate 28 have been imaged. Transferring a uniformly low quantity of liquid layer 29 is essential to successfully creating transparencies which avoid streaking or blotched areas because of excess liquid, especially where oil is used.

Some appropriately small and finite quantity of the liquid in the liquid layer forming the intermediate transfer surface 12 also is transferred to the final receiving substrate in areas adjacent the transferred ink image 26. This relatively small transfer of the liquid from the intermediate transfer surface 12 with the ink image 26 and to the non-imaged areas on the optically transmissive final receiving substrate 28 can permit multiple pages of the receiving substrate 28 to be imaged before it is necessary to replenish the sacrificial liquid layer forming the intermediate transfer surface 12. Replenishment may be necessary after fewer final imaged copies, depending on the quality and nature of the optically transmissive final receiving surface 28 that is utilized.

While the thickness of the liquid layer forming the intermediate transfer surface 12 on the supporting surface or drum 14 can be measured, such as by the use of reflectance Fourier Transform infrared spectroscopy or a laser interferometer, it is theorized that the thickness can vary from about 0.03 microns to about 60 microns, more preferably from about 0.1 to about 50, and most preferably from about 0.3 to about 0.6 microns. The thickness of the layer forming the intermediate transfer surface 12 can increase if rougher surfaced supporting surfaces or drums 14 are employed. The surface topography of the supporting surface or drum 14 can have a roughness average ($R_a$) of from about 254 Angstroms to about 25,400 Angstroms (about 1 microinch to about 100 microinches), and a more preferred range of from about 2500 Angstroms to about 7500 Angstroms (about 5 to about 10 microinches). For transparencies, it is preferable to have a roughness average of less than 10 microinches. The image quality will degrade when too thick of a liquid layer is used to form the intermediate transfer surface 12.

Suitable liquids that may be employed as the intermediate transfer surface 12 include water, fluorinated oils, glycol, surfactants, mineral oil, silicone oil, functional oils or combinations thereof. Functional oils can include, but are not limited to, mercapto-silicone oils, fluorinated silicone oils and the like. Although satisfactory results have been achieved with a wide range of viscosities, a preferred intermediate transfer surface has a viscosity of about 50 to about 100 centistokes (cSt).

The liquid layer 12 that forms the intermediate transfer surface on the surface of drum 14 is heated by an appropriate heater device 19. Heater device 19 may be a radiant resistance heater positioned as shown or, more preferably, positioned internally within the drum 14. Heater devices 21 and 24 can also be employed in the final receiving substrate guide apparatus 20 and in the fusing and fixing roller 22, respectively. Heater device 19 increases the temperature of the liquid intermediate transfer surface from ambient temperature to between about 25° C. to about 70° C. or higher. This temperature is dependent upon the exact nature of the liquid employed in liquid layer or intermediate transfer surface 12 and the ink employed. A more preferred range is between about 30° C. to about 60° C., and a most preferred range is from about 45° C. to about 52° C.

Heater 21 preheats the final receiving medium prior to the fixation of the ink image by being set to heat between about 70° C. to about 200° C., more preferably to between about 80° C. and about 140° C., and most preferably to between about 80° C. to about 120° C. It is theorized that heater 21 raises the temperature of a thermally stable and/or biaxially oriented transmissive final receiving medium to between about 70° C. and about 90° C. However, the thermal energy of the receiving media is kept sufficiently low so as not to melt the ink upon transfer to the final receiving substrate 28. It is also critical that the temperature of the receiving media be kept below the glass transition temperature ($t_g$) of the media itself so that the media retains its original dimensions and shape. Heater 24, when employed, heats the transfer and fixing roller 22 to a temperature of between about 25° C. and about 200° C. and alternatively may also be employed internally within roller 22.

The ink used to form the ink image 26 preferably must have suitable specific properties for viscosity. Initially, the viscosity of the molten ink must be matched to the requirements of the ink jet device utilized to apply it to the intermediate transfer surface 12 and optimized relative to other physical and rheological properties of the ink as a solid, such as yield strength, hardness, elastic modulus, loss modulus, ratio of the loss modulus to the elastic modulus, and ductility. The viscosity of the phase change ink carrier composition has been measured on a Ferranti-Shirley Cone Plate Viscometer with a large cone. At about 140° C. a preferred viscosity of the phase change ink carrier composition is from about 5 to about 30 cSt, more preferably from about 10 to about 20 cSt, and most preferably from about 11 to about 15 cSt. The surface tension of suitable inks is between about 23 and about 50 dynes/centimeter. An appropriate ink composition is that described in U.S. Pat. No. 4,889,560 issued Dec. 26, 1989 and assigned to the assignee of the present invention.

Such an ink has a composition comprising a fatty amide-containing material employed as a phase change ink carrier composition and a compatible colorant. The fatty amide-containing material comprises a tetraamide compound and a monoamide compound. The phase change ink carrier composition is in a solid phase at ambient temperature and in a liquid phase at elevated operating temperature. The phase change ink carrier composition can comprise from about 10 to about 50 weight percent of a tetraamide compound, from about 30 to about 80 weight percent of a secondary monoamide compound, from about 0 to about 40 weight percent of a tackifier, from about 0 to about 25 weight percent of a plasticizer, and from about 0 to about 10 weight percent of a viscosity modifying agent.

The subject phase change ink used in the instant invention is formed from a phase change ink carrier composition which exhibits excellent physical properties. For example, the subject phase change ink, unlike prior art phase change inks, exhibits a high level of lightness, chroma, and transparency when utilized in a thin film of substantially uniform thickness. This is especially valuable when color images are conveyed using overhead projection techniques. Furthermore, the preferred phase change ink compositions exhibit the preferred mechanical and fluidic properties mentioned above when measured by dynamic mechanical analyses (DMA), compressive yield testing and viscometry. More importantly, these work well when used in the printing process of the instant invention utilizing a liquid layer as the intermediate transfer surface.

The transmission spectra for each of the phase change inks used in the process of this invention were evaluated on a commercially available spectrophotometer, the ACS Spectro-Sensor II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall calorimetric performance of the inks used in the process and as a part of this invention, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness), (CIELAB) values for each phase change ink sample. In addition, the values for CIELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Unlike conventional phase change ink carriers, the nature of the phase change ink carrier composition of the inks used in the process of the present invention is such that thin films of substantially uniform thickness exhibit a relatively high L* value. For example, a substantially uniform thin film of about 20 micron thickness of the phase change ink carrier composition of this invention preferably has an L* value of at least about 65, more preferably at least about 75, and most preferably at least about 85.

The phase change inks used herein have a relatively high C*ab value when measured as a thin film of substantially uniform thickness. Previously, conventional phase change inks have had a very low degree of rectilinear light transmissivity, even in thin films of substantially uniform thickness. The phase change ink composition used in the process of this invention has C*ab values, when applied as a substantially uniform thin film of about 10 micron thickness with substractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the L* value of a substantially uniform thin film of about 10 microns thickness of a black color phase change ink is preferably not more than about 35, more preferably not more than about 30, and most preferably not more than about 25.

The respective phase change ink and ink carrier compositions, when transferred to the optically transmissive final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-11 resurfacing disk. Samples printed on light transmissive thin films were tested using ASTM D1304Q-85 (Standard Test Method For Resistance of Transparent Plastics to Surface Abrasion). The results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a thin film substrate and placing that substrate in a manila folder under a one pound piece of aluminum, about 21.6 cm (8.5 inches) wide and 27.9 cm (11 inches) long to evenly distribute the weight of a 4.5 kg. (10 pound) block. These printed samples are placed in an oven for 24 hours at a constant temperature of about 60° C. Print samples of the phase change ink of the present invention, subjected to the above described blocking test showed no blocking.

The phase change ink compositions were analyzed by compressive yield testing. The compressive yield strength measurements were done on an MTS SINTECH 2/D mechanical tester manufactured by MTS Sintech, Inc. of Cary, N.C., using small cylindrical sample blocks. The dimensions of a typical sample are about 19.0±1.0 mm×about 19.0±1.0 mm. Isothermal yield stress was measured as a function of temperature (about 25° to about 80° C.) and strain rate. The material was deformed up to about 40%.

The preferred yield stresses as a function of temperature for suitable phase change ink compositions for use in the indirect printing process of the present invention are described by an equation as follows:

$$YS = mT + I$$

wherein YS, which is a function of temperature, is the yield stress, m is the slope, T is the temperature, and I is the intercept.

Under non-process conditions, i.e., after the final printed product is formed or conditions under which the ink sticks are stored, and the ink is in a ductile state or condition at a temperature range of from at least about 10° to about 60° C., the preferred yield stress values are described by m as being from about −9±−2 psi/° C. to about −36±−2 psi/° C. and I as being from about 56.25±7.03 kg/sq cm (800±100 psi) to about 154.7±7.03 kg/sq cm (2200±100 psi). More preferably, m is about −30±−2 psi/° C. and I is about 119.5±7.03 kg/sq cm (1700±100 psi). Under process conditions, i.e., during the indirect printing of the ink from an intermediate transfer surface onto a substrate while the ink is in a malleable solid condition or state, at a temperature of from at least about 30° C. to about 80° C., the preferred stress values are described by m as being from about −6±−2 psi/° C. to about −36±−2 psi/° C. and I as being from about 56.3±7.03 kg/sq cm (800±100 psi) to about 112.5±7.03 kg/sq cm (1600±100 psi). More preferably, m is about −9±−2 psi/° C. and I is about 66.8±7.03 kg/sq cm (950±100 psi).

In operation, the support surface or drum 14 has a layer of liquid intermediate transfer surface applied to its surface by the action of the applicator assembly 16. Assembly 16 is raised by an appropriate mechanism (not shown), such as an air cylinder, until the wicking pad 15 is in contact with the surface of the drum 14. The liquid is retained within a reservoir (not shown) within the assembly 16 and passes through the porous supporting material 18 until it saturates the wicking pad 15 to permit a uniform layer of desired thickness of the liquid to be deposited on the surface of the drum 14. The drum 14 rotates about a journalled shaft in the direction shown in FIG. 1 while the heater 19 heats the liquid layer and the surface of the drum 14 to the desired temperature. Once the entire periphery of the drum 14 has been coated, the applicator apparatus is lowered to a non-contact position with the liquid layer forming the intermediate transfer surface 12 on the exterior of the drum 14.

Ink is applied to the exposed surface of the liquid intermediate transfer surface 12 by the printhead 11. The ink is applied in molten form, having been melted from its solid state form by appropriate heating means (not shown). The ink image 26 solidifies on the surface of the liquid by cooling to a malleable solid intermediate state as the drum continues to rotate, entering the nip formed by the roller 22 and the curved surface of the intermediate transfer surface 12 supported by the drum 14. The ink image 26 is deformed to its final image conformation and adhered to the optically transmissive final receiving surface 28 by being pressed thereagainst. The ink image 26 is thus transferred and fixed to the final receiving surface 28 by the pressure exerted on it in the nip by the resilient or elastomeric surface of the roller 22. Stripper fingers 25 help to remove the imaged optically transmissive final receiving surface 28 from the liquid intermediate transfer surface 12 as the drum rotates. The ink image 26 then cools to ambient temperature where it possesses sufficient strength and ductility to ensure its durability.

After a predetermined number of imagings, such as 10 or fewer as needed, the applicator assembly 16 is actuated to raise upward into contact with the sacrificial intermediate transfer surface 12 to replenish the liquid forming the surface 12.

The following examples present different techniques and materials for carrying out the invention, including the type of supporting surfaces employed to accept the liquid intermediate transfer surface for successful imaging of optically transmissive media in the apparatus of the invention.

EXAMPLE I

A test fixture having a rotatably mounted aluminum cylindrical drum with an outer diameter of 101.07 mm, an inner diameter of 93.37 mm, and a length of 222 mm was positioned closely adjacent to a transfer and fusing roller of smaller diameter. The drum surface was machined with a single crystal diamond tool while the drum was turned on a high speed lathe. The drum was subsequently anodized with a conventional sulfuric type II anodize and coated with a silicone oil. The drum surface was not water sealed after anodization.

A piezoelectrically driven printhead with phase change ink was positioned intermediate the drum and the transfer and fusing roller to deliver in raster fashion ink in the primary colors of cyan, magenta, yellow, and black to the exposed surface of a thin liquid layer of an intermediate transfer surface. The drum temperature was maintained at about 45° C.

The heated drum surface was coated with a 5 cSt silicone oil sold under the tradename Dow Corning 200 Fluid. The oil was applied by an oil impregnated polyester web contained within a raisable cassette assembly. The web was pressed into contact with the drum surface during two drum rotations with a force of about 44.5 Newtons (10 pounds) for less than about 0.6 seconds at an application speed of about 101 centimeters (40 inches) per second. Once the drum surface was fully coated with the liquid layer to form the intermediate transfer surface, the cassette assembly was lowered out of contact with the drum.

Mylar® was used as the final receiving substrate and was preheated by an external heating device to a temperature of about 120° C. prior to being brought into contact with the transferred ink image. The transfer and fusing roller was also heated by an external heating device having a setpoint of about 120° C.

During imaging the drum was rotated at a surface speed of about 84.6 centimeters (33.3 inches) per second. During transfer and fixing, the surface speed of the roller was about 12.7 centimeters (5 inches) per second and the pressure in the nip between the drum and the roller averaged about 32.6 kg/sq cm (463 pounds per square inch). A full color test image was imaged by the printhead on the liquid intermediate transfer layer and then contact transferred to Mylar® film.

The percentage of light transmitted through the imaged transparency was measured with an ASTM D-1003-61 compliant Hazegard System XL-211 calibrated with a GTS-2876 standard. The results of those measurements showed that about 80 percent of the rectilinear light impinging on the surface of the transparency was transmitted.

EXAMPLE II

The same test fixture and conditions as described above for Example I were employed, except that the drum temperature was maintained at about 55° C.

The percentage of light transmitted through the imaged transparency was again measured with an ASTM D-1003-61 compliant Hazegard System XL-211 calibrated with a GTS-2876 standard. Results showed that about 65 percent of the rectilinear light impinging the surface of the imaged transparency was transmitted. Inked areas on the transparency revealed a cracked topology when viewed under high magnifications. The cracking and consequent reduced transmissiveness resulted from the cohesive failure of the ink caused by elevated temperatures.

EXAMPLE III

A test fixture having a rotatably mounted Monel 400 copper nickel cylindrical drum of dimensions similar to those utilized in Example I was positioned closely adjacent to a transfer and fusing roller of smaller diameter. The drum surface was divided into halves delineated by an imaginary plane perpendicularly bisecting the long axis of the drum. Both surface halves were sandblasted with 25 micron particles. One half was then further electropolished with an electrical current density of 44 amperes per minute while immersed in a phosphoric-sulfuric acid bath.

Both halves were coated with a 350 cSt silicone oil. Similarly to Example I, the oil was applied by an oil impregnated polyester web contained within a raisable cassette assembly. The web was pressed into contact with the drum surface during two drum rotations with a force of about 35.6 Newtons (8 pounds) for less than about 0.6 seconds at an application speed of about 101 cm per second (40 inches per second). Once the drum surface was fully coated with the liquid layer to form the intermediate transfer surface, the cassette assembly was lowered out of contact with the drum.

As in Examples I and II, a piezoelectrically driven printhead with phase change ink was positioned intermediate the drum and the transfer and fusing roller to deliver in raster fashion ink in the primary colors of cyan, magenta, yellow, and black to the exposed surface of a thin liquid layer of an intermediate transfer surface. The drum temperature was maintained at about 49° C.

Mylar® was used as the receiving substrate and was preheated by an external heating device to a temperature of about 120° C. prior to being brought into contact with the transferred ink image. The transfer and fusing roller was also heated by an external heating device having a set point of about 120° C.

During imaging, the drum was rotated at a surface speed of about 84.6 cm (33.3 inches) per second. During transfer and fixing, the surface speed of the roller was about 12.7 cm (5 inches) per second and the pressure in the nip between the drum and the roller averaged about 32.6 kg/sq cm (463 pounds per square inch). A full color test image was imaged by the printhead on the liquid intermediate transfer layer and then contact transferred to Mylar® film.

Measurement according to the technique of Examples I and II showed that transparency areas imaged using the sandblasted drum surface transmitted about 30 percent of impinging rectilinear light. Areas that had been imaged with the sandblasted and electropolished drum surface transmitted about 55 percent of the impinging rectilinear light.

While the invention has been described above with reference to specific embodiments thereof, it is apparent that many changes, modifications and variations in the materials, arrangements of parts and steps can be made without departing from the inventive concept disclosed herein. For example, the liquid layer also could be applied to the supporting surface from an internal, in the instance of a drum, or underlying resupply source or reservoir so that it passes to the surface by seeping or penetrating through the porous surface. The porous surface could be sponge-like, such as an appropriated sintered metal. The liquid could also pass to the surface by diffusion, such as its first being absorbed into microscopic pores within the surface of the support surface and then diffusing out. Accordingly, the spirit and broad scope of the appended claims is intended to embrace all such changes, modifications and variations that may occur to one of skill in the art upon a reading of the disclosure.

We claim:

1. A method of imaging an optically transmissive medium using an ink jet printer, comprising the steps of:

applying a liquid layer to a first supporting surface, the liquid layer serving as an intermediate transfer surface that has an exposed surface not in contact with the supporting surface and an opposing second surface in contact with the supporting surface, imaging the exposed surface of the liquid layer to form an image thereon; and transferring the image to an optically transmissive receiving medium.

2. The method according to claim 1 further comprising conditioning the first supporting surface to cooperate with the liquid layer to optimize an optical characteristic of the image transferred to the optically transmissive receiving medium.

3. The method according to claim 2 in which the conditioning of the first supporting surface is accomplished by a technique selected from a group consisting essentially of mechanical abrasion, chemical or electrical interaction, electrochemical interaction, thermal control, or a combination thereof.

4. The method according to claim 3 in which the conditioning of the first supporting surface further comprises coating the first supporting surface by an electrochemical process.

5. The method according to claim 4 in which the conditioning of the first supporting surface further comprises sealing the coated first supporting surface by a liquid.

6. The method according to claim 2 in which the conditioning of the first supporting surface comprises coating the first supporting surface by an electrochemical process.

7. The method according to claim 1 further comprising repeating the imaging and transferring steps a predetermined number of times.

8. The method according to claim 1 further comprising repeating the imaging two times to place an bit-mapped image twice on the exposed surface in the same location and then transferring the image to the optically transmissive receiving surface.

9. The method according to claim 8 further comprising the bit-mapped image being created with the use of a dithering pattern that creates empty spaces such that for primary color solid area fills the color density is about 85% to about 95% of normal color density and for secondary colors the color density is about 65% to about 75% of normal color density.

10. Apparatus for use in an ink jet printing system for imaging an optically transmissive medium comprising:

a first supporting surface;

apparatus for applying a liquid layer to the first supporting surface to create an intermediate transfer surface thereon, the intermediate transfer surface having a first surface in contact with the first supporting surface and an exposed second surface not in contact with the supporting surface;

apparatus for imaging the exposed surface of the liquid layer to form an image thereon; and apparatus for transferring the image to an optically transmissive final receiving medium.

11. The apparatus according to claim 10 wherein the first supporting surface is conditioned to cooperate with the liquid layer to optimize an optical characteristic of the image transferred to the optically transmissive final receiving medium.

12. The apparatus according to claim 10 wherein the conditioned first supporting surface is physically roughened by a technique selected from a group consisting of mechanical abrasion, chemical or electrical interaction, electrochemical interaction, or a combination thereof.

13. The apparatus according to claim 12 wherein the conditioned first supporting surface bears a coating applied by an electrochemical process.

14. The apparatus according to claim 13 wherein the conditioned first supporting surface is sealed by a liquid.

15. The apparatus according to claim 10 wherein the first supporting surface is conditioned by means selected from a group consisting essentially of mechanical means, chemical means, electrical means, electrochemical means, thermal means, or a combination thereof.

16. The apparatus according to claim 10 wherein the first supporting surface is a rotatable drum mounted to the imaging apparatus.

17. The apparatus according to claim 10 wherein the apparatus for applying a liquid layer to the first supporting surface comprises a web that is raisable into and out of contact with the first supporting surface.

18. The apparatus according to claim 10 wherein the apparatus for imaging the exposed surface comprises an ink jet print head which selectively ejects ink.

19. The apparatus according to claim 10 wherein the apparatus for imaging the exposed surface comprises a heating device to melt a solid ink from the solid state to a molten state prior to ejection from the ink jet print head.

20. The apparatus according to claim 19 further comprising a device that permits the ink applied to the exposed surface of the liquid layer to cool and solidify to a malleable condition.

21. The apparatus according to claim 10 wherein the apparatus for transferring the ink image to the optically transmissive final receiving medium comprises a roller to pressure fuse the ink image to the final receiving medium by deforming the ink image and adhering the ink-image thereto.

22. The apparatus according to claim 11 further comprising apparatus to cool the transferred and deformed ink image to a ductile and fracture resistant condition at ambient air temperature.

23. Apparatus for use in an ink jet printing system for imaging an optically transmissive medium comprising:

a first supporting surface;

apparatus for applying a liquid layer to the first supporting surface to create an intermediate transfer surface thereon, the intermediate transfer surface having a first surface in contact with the first supporting surface and an exposed second surface not in contact with the supporting surface;

apparatus for creating a bit-mapped image by using a dithering pattern to create empty spaces in the bit-mapped image;

apparatus for imaging the exposed surface of the liquid layer to form the bit-mapped image thereon; and apparatus for transferring the image to an optically transmissive final receiving medium.

24. The apparatus according to claim 23 wherein the dithering pattern in the bit-mapped image has primary solid area fills with a color density that is about 85% to about 95% of normal color density and for secondary colors the color density of solid area fills is about 65% to about 75% of normal color density.

25. The apparatus according to claim 23 wherein the apparatus for imaging the exposed surface of the liquid layer repeats the imaging a second time to place a bit-mapped image twice on the exposed surface in the same location prior to transferring the image to the optically transmissive surface.

* * * * *

UNITED STATES PATENT AND TRADEMARK OFFICE
CERTIFICATE OF CORRECTION

PATENT NO. : 5,790,160
DATED : August 4, 1998
INVENTOR(S) : Barry D. Reeves, et al.

It is certified that error appears in the above-identified patent and that said Letters Patent is hereby corrected as shown below:

Column 5, line 12, after "and" and before "properties" delete "Theological" and insert --rheological--.

Signed and Sealed this

Eighth Day of December, 1998

Attest:

Attesting Officer

BRUCE LEHMAN

Commissioner of Patents and Trademarks